(12) United States Patent
Terribilini et al.

(10) Patent No.: US 9,246,923 B1
(45) Date of Patent: Jan. 26, 2016

(54) DEVELOPER RISK CLASSIFIER

(71) Applicant: Google Inc., Mountain View, CA (US)

(72) Inventors: Ryan James Terribilini, San Francisco, CA (US); Alec Go, Mountain View, CA (US)

(73) Assignee: Google Inc., Mountain View, CA (US)

( * ) Notice: Subject to any disclaimer, the term of this patent is extended or adjusted under 35 U.S.C. 154(b) by 91 days.

(21) Appl. No.: 14/158,859

(22) Filed: Jan. 19, 2014

(51) Int. Cl.
| | |
|---|---|
| G06F 7/04 | (2006.01) |
| H04L 29/06 | (2006.01) |
| G06F 21/55 | (2013.01) |
| G06Q 20/40 | (2012.01) |
| G06F 21/51 | (2013.01) |
| G06F 21/57 | (2013.01) |

(52) U.S. Cl.
CPC ............ H04L 63/101 (2013.01); G06F 21/554 (2013.01); *G06F 21/51* (2013.01); *G06F 21/57* (2013.01); *G06F 21/577* (2013.01); *G06Q 20/4016* (2013.01)

(58) Field of Classification Search
CPC ....... G06F 21/51; G06F 21/57; G06F 21/554; G06F 21/577; G06Q 20/4016
USPC .................................................... 726/26, 23
See application file for complete search history.

(56) References Cited

U.S. PATENT DOCUMENTS

| | | | |
|---|---|---|---|
| 7,725,544 B2 | 5/2010 | Alspector et al. | |
| 8,151,349 B1* | 4/2012 | Yee ......................... | G06F 21/51 713/162 |
| 8,763,131 B2* | 6/2014 | Archer .................. | G06F 21/577 713/187 |
| 2004/0215977 A1 | 10/2004 | Goodman et al. | |
| 2011/0022406 A1* | 1/2011 | Fox ....................... | G06Q 40/08 705/1.1 |
| 2011/0154439 A1* | 6/2011 | Patel ..................... | G06F 21/554 726/3 |
| 2012/0072991 A1* | 3/2012 | Belani ................... | H04W 4/001 726/25 |
| 2012/0096516 A1 | 4/2012 | Sobel et al. | |
| 2012/0210422 A1 | 8/2012 | Friedrichs et al. | |
| 2012/0222111 A1 | 8/2012 | Oliver et al. | |
| 2013/0054711 A1 | 2/2013 | Kessner et al. | |
| 2013/0191918 A1 | 7/2013 | Nachenberg | |
| 2013/0318568 A1 | 11/2013 | Mahaffey et al. | |
| 2013/0326625 A1 | 12/2013 | Anderson et al. | |
| 2014/0214610 A1* | 7/2014 | Moshir .............. | G06Q 20/4016 705/26.35 |
| 2015/0150137 A1* | 5/2015 | Bettini .................... | G06F 21/57 726/25 |
| 2015/0161672 A1* | 6/2015 | Jung .................. | G06Q 30/0269 705/14.66 |

* cited by examiner

*Primary Examiner* — Samson Lemma
(74) *Attorney, Agent, or Firm* — Morris & Kamlay LLP

(57) ABSTRACT

Systems and techniques are provided for the classification of risks associated with developers in an application ecosystem. Signals associated with a developer account for an application ecosystem may be received. Each of the signals may include one of an account signal, an application signal, and a financial signal, and each of the signals may be associated with a weight and a score. The signals may be combined using the weights and the scores associated with the signals to obtain a risk probability for the developer account. The risk probability may be scored.

17 Claims, 3 Drawing Sheets

| 410 | 420 | 430 | 440 | 450 | 460 |
|---|---|---|---|---|---|
| Ban | Developer Name | Risk Probability | Status | Signals | Prevalence |
| ☐ | AppDev1 | 1.0 | Banned | Spam<br>Advertising ID 1<br>Advertising ID 2<br>Device ID | 2/3<br>1/2<br>0/1<br>1/2 |
| ☑ | AppDev2 | .93 | Paid | Spam<br>Advertising ID 1<br>Device ID | 2/3<br>1/2<br>1/2 |
| ☐ | AppDev3 | 0.87 | Banned | Spam | 2/3 |
| ☐ | AppDev4 | 0.57 | Paid | Certificate<br>Assets | 2/4<br>2/4 |

400

| Ban | Developer Name | Risk Probability | Status | Signals | Prevalance |
|---|---|---|---|---|---|
| ☐ | AppDev1 | 1.0 | Banned | Spam<br>Advertising ID 1<br>Advertising ID 2<br>Device ID | 2/3<br>1/2<br>0/1<br>1/2 |
| ☑ | AppDev2 | .93 | Paid | Spam<br>Advertising ID 1<br>Device ID | 2/3<br>1/2<br>1/2 |
| ☐ | AppDev3 | 0.87 | Banned | Spam | 2/3 |
| ☐ | AppDev4 | 0.57 | Paid | Certificate<br>Assets | 2/4<br>2/4 |

400

410 420 430 440 450 460

DEVELOPER RISK CLASSIFIER

BACKGROUND

An application ecosystem may be open, allowing any party to develop and submit applications to the application ecosystem for distribution. Applications developers may have their developer accounts banned from submitting applications to the application ecosystem for a variety of reasons, such as the submission of applications containing viruses or malware, or applications that violate data gathering, advertising, hardware usage, or other policies of the application ecosystem. Because the application ecosystem is open, a developer who had their developer account banned from submitting applications may create a new developer account from which to submit applications.

Preventing developers whose developer accounts were banned from submitting applications using new developer accounts may be difficult. When the developer opens a new developer account, it may be unclear that the developer who opened the developer account is in fact the developer who had their previous developer account banned. Application level signals, such as an advertising identification given to the developer or a certificate used by the developer to sign applications, may be matched between applications that were submitted from a banned developer account and applications from a new developer account to help ascertain whether the same developer is responsible for both the banned and new developer account. However, these application signals may not help locate clusters of developer accounts that are related to one another despite belonging to multiple developers, which may occur when a developer uses multiple names to open developer accounts, and may not provide enough information for a person or automated system to be able to quickly decide whether to ban the new account.

BRIEF SUMMARY

According to an embodiment of the disclosed subject matter, signals associated with a developer account for an application ecosystem may be received, where each of the signals may include one of an account signal, an application signal, and a financial signal, and each of the signals may be associated with a weight and a score. The signals may be combined using the weights and the scores associated with the signals to obtain a risk probability for the developer account. The risk probability may be stored.

Combining the signals may include summing the result of multiplying the score for each of the at least signals by the weight for the signal to obtain a sum; and dividing the sum by the number of signals used to obtain the sum. The scores associated with one of the signals may be based on a banned prevalence percentage. The developer account may be banned from the application ecosystem based on the risk probability.

The account signal may include one of a spam signal, an Internet Protocol address signal, and an umbrella account conversion time signal. The application signal may include one of an application flagging signal, an advertising identification signal, a certificate signal, an asset signal, and a combination application signal, and the financial signal may include a buyer signal.

The spam signal may include a score based on a quantity of umbrella accounts and developer accounts associated with a user of the developer account. The score for the Internet Protocol address signal may be based on matching an Internet Protocol address associated with the developer account to Internet Protocol addresses associated with banned developer accounts in the application ecosystem. The score for the umbrella account conversion time signal may be based on the amount of elapsed time between the creation of an umbrella account and a conversion of the umbrella account into the developer account. The score for the application flagging signal may be based on a flag set for an application submitted from the developer account to the application ecosystem, wherein the flag indicates one of a security risk or policy violation in the application. The score for the advertising identification signal may be based on matching advertising identifications used by applications submitted from the developer account to advertising identifications used by applications submitted from banned developer accounts in the application ecosystem. The score for the asset signal may be based on matching assets used to build applications submitted from the developer account to assets used to build applications submitted from banned developer accounts in the application ecosystem. The score for the buyer signal may be based on matching at least one data item for a user associated with the developer account to a one data item for users of banned developer accounts in the application ecosystem. The score for the combination application signal may be based on the advertising identification signals, the certificate signal, and the asset signal.

The data item may include one of a contact name, a company name, a phone number, a physical address, an email address domain, an email address, a payment instrument, an Internet Protocol address, and a unique identifier for a computing device. The banned prevalence percentage may be based on the number of banned developer accounts comprising a characteristic of a signal matching a characteristic of the signal in the developer account, and the total number of developer accounts in the application ecosystem comprising the characteristic of the signal. The characteristic of the signal may be one item selected from the group of: an advertising identification for an application, a certificate used to sign the application, an asset used to build the application, and an Internet Protocol address used to access the developer account. One of the weights for one of the signals may be a super-weight.

According to an embodiment of the disclosed subject matter, a means for receiving signals associated with a developer account for an application ecosystem, where each of the signals may include one of an account signal, an application signal, and a financial signal, and each of the signals may be associated with a weight and a score, a means for combining the signals using the weights and the scores associated with the signals to obtain a risk probability for the developer account, a means for storing the risk probability, a means for summing the result of multiplying the score for each of the signals by the weight for the signal to obtain a sum; and a means for dividing the sum by the number of signals used to obtain the sum, are included.

Systems and techniques disclosed herein may allow for the classification of risks associated with developers in an application ecosystem. Additional features, advantages, and embodiments of the disclosed subject matter may be set forth or apparent from consideration of the following detailed description, drawings, and claims. Moreover, it is to be understood that both the foregoing summary and the following detailed description are illustrative and are intended to provide further explanation without limiting the scope of the claims.

BRIEF DESCRIPTION OF THE DRAWINGS

The accompanying drawings, which are included to provide a further understanding of the disclosed subject matter, are incorporated in and constitute a part of this specification. The drawings also illustrate embodiments of the disclosed subject matter and together with the detailed description serve to explain the principles of embodiments of the disclosed subject matter. No attempt is made to show structural details in more detail than may be necessary for a fundamental understanding of the disclosed subject matter and various ways in which it may be practiced.

DETAILED DESCRIPTION

Figure 1:
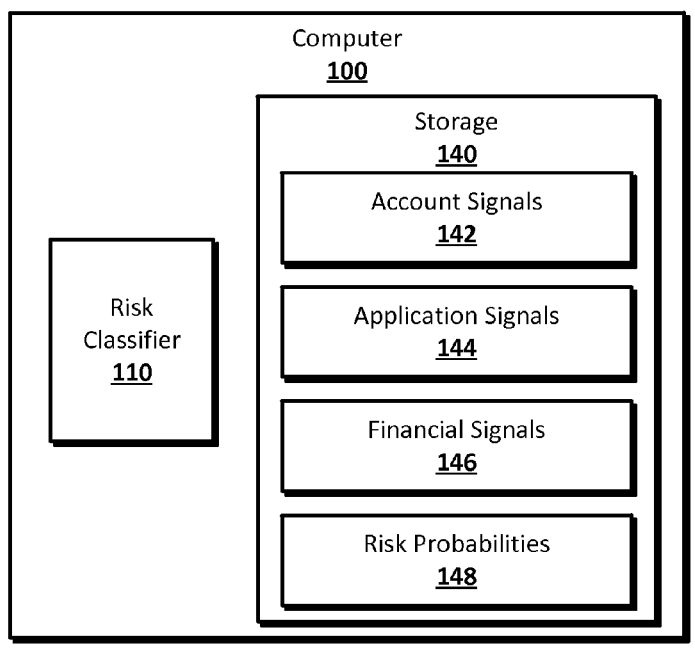
FIG. 1 shows an example system suitable for a developer risk classifier according to an implementation of the disclosed subject matter.

A developer risk classifier may use multiple signals from developer accounts to assist in determining whether a developer account is related to a banned developer account. In an implementation of the disclosed subject matter, a risk probability for a developer account in an application ecosystem may be determined using account signals, application signals, and financial signals associated with the developer account. In general, a signal as disclosed herein includes any indicator, such as a binary yes/no or true/false indicator, a probability, a ranking, an occurrence count, a score, or the like, that provides information relating to a particular aspect of one or more accounts, users, identities, or the like. The risk probability may be an indicator, for example, a probability from 0% to 100% expressed in any suitable manner, of whether the developer account was opened by a bad developer, for example, a developer who has had previous developer accounts banned from the application ecosystem. The risk probability may be used to determine whether to ban the developer account as part of a manual or automated review of the developer account. A high risk probability may make it more likely that a developer account will be banned.

The risk probability for a developer account may be determined using account signals, application signals, and financial signals associated with the developer account. The account signals may include, for example, a spam signal, an Internet Protocol (IP) address signal, and an umbrella account conversion time signal. The application signals may include an application flagging signal, an advertising identification signal, a certificate signal, and an asset signal. The advertising identification signal, the certificate signal, and the asset signal may also be combined into a combination application signal. The financial signals may include a buyer signal. Each of the signals may be scored.

The spam signal for a developer account may have a score based on the number of accounts, including developer accounts and umbrella accounts, created by the user who created the developer account. The umbrella account may be an account for a larger ecosystem that includes, for example, e-mail services, cloud storage, and other services, along with access to the application ecosystem. For example, a higher number of overall accounts created by the same user that created the developer account may result in a high score for the spam signal for the developer account.

The IP address signal for a developer account may include the IP addresses used to log in to the developer account, and may be scored based on matching the IP addresses used to log in to the developer account with the IP addresses used to log in to other developer accounts, such as developer accounts that have been banned. For example, if the IP addresses used to log in to the developer account were also used to log in to developer accounts that have been banned, a score for IP addresses signal for the developer account may be high.

The umbrella account conversion time signal for the developer account may be the amount of time between the creation of an umbrella account for the larger ecosystem of which the application system is a part and the conversion of the umbrella account into a developer account for the application ecosystem, and may be scored based on the amount of time. For example, an umbrella account that is quickly, for example, within 72 hours, converted into a developer account for the application ecosystem may have a high score for the umbrella account conversion time signal.

The application flagging signal for the developer account may be based on whether an application submitted to the application ecosystem has been flagged as security risk or as being in violation of policies of the application ecosystem. The flagging of applications may be done by, for example, an application scorer, which may score applications based on the level of security risk they pose or level of violation of application ecosystem policies and flag applications with scores that reach a threshold. The presence of absence of a flag for an application may then be converted to an application flagging score. For example, the developer account that submitted an application that was flagged as a security risk may have a high score for the application flagging signal.

The advertising identification signal for the developer account may include the advertising identifications used by the developer account. The advertising identifications may be unique identifiers issued by, for example, the application ecosystem, to allow developers to collect advertising revenue from their applications, and may be used by the developer account for both the developer account itself and the applications submitted through the developer account. The advertising identifications signal may be scored by matching the advertising identifications used by the developer account and applications submitted from the developer account to the advertising identifications used by banned developer accounts and the applications submitted from the banned developer accounts. For example, if the advertising identifications used in the applications submitted from the developer account match the advertising identifications used by applications submitted by a high number banned developer accounts, a score for the advertising identification signal for the developer account may be high.

The certificate signal for the developer account may include the certificates used to sign applications submitted from the developer account. The certificates may be issued by, for example, the application ecosystem. The certificates signal may be scored by matching the certificates used to sign application submitted from the developer account to the certificates used to sign applications submitted from banned developer accounts. For example, if the developer account submits applications signed with certificates that have also been used to sign applications submitted from banned developer accounts, a score for the certificate signal for the developer account may be high.

The asset signal for the developer account may include the assets used within applications submitted by the developer account. Assets, such as libraries, may be used by developers to construct applications for the application ecosystem, and may be reused in different applications. The asset signal may be scored by matching the assets used in applications submitted from the developer account to assets used in applications submitted from banned developer accounts. For example, if the assets used by applications submitted by the developer account match assets used in applications submitted by banned developer accounts, a score for the asset signal for the developer account may be high.

The combination application signal may be a combination of the advertising identification signal, the certificate signal, and the asset signal for the applications submitted from the developer account. For example, a certain number of total matches for the advertising identifications, assets, and certificates used by the applications submitted from the developer account with applications submitted from banned developer accounts may be correlated with a certain score for the combination application signal, with, for example, a higher number of matches resulting in a higher score.

The buyer signal may include data items about the user who opened the developer account, and may be scored based on matching the data items about the user who opened the developer account with data items for users who opened developer accounts that were banned. Data items used for matching may include individual names, company names, e-mail addresses, physical addresses, phone numbers, IP addresses and payment information. For example, the more data items that are matched between the user who opened the developer account and the users who opened banned developer accounts, the higher the score for the buyer signal for the developer account may be.

Each of the signals may be scored on the same scale, for example, between 0 and 100%, or 0 and 1.0, and may have an associated weight that determines that importance of the signal when determining the risk probability of the developer account. The weights associated with the signals may be configurable parameters, and may be preset or determined dynamically, for example, through machine learning.

Certain signals, such as, for example, the advertising identification signal, the certificate signal, the asset signal, and the IP address signal, may be scored based on a banned prevalence percentage. The banned prevalence percentage may be determined based on the number of matches among banned developer accounts and the number of matches among all developer accounts. For example, if the advertising identification used by the developer account matches the advertising identification used by 3 banned developer accounts and 4 total developer accounts, the banned prevalence percentage may be ¾=75%, or 0.75, indicating that banned developer accounts using the advertising identification have a prevalence of 75% among all developer accounts using the advertising identification. The banned prevalence percentage may be converted into a score for the signal in any suitable manner, for example, using a score table correlating banned prevalence percentages with scores. The same banned prevalence percentage may result in different scores for different signals.

The various account signals, financial signals, and application signals for the developer account may be combined to determine the risk probability for the developer account. For example, the score for each of the signals for the developer account may be multiplied by the weight for the signal, with the result being summed across all of the signals. This sum may then be divided by the number of signals used to produce the risk probability for the developer account. Not all of the signals may be used when determining the risk probability for the developer account, as not all of the signals may be available for the developer account.

The risk probability for the developer account may be used to determine whether the developer account should be banned from submitting applications to the application ecosystem. For example, the risk probability for the developer account may be presented to a user, such as an administrator for the application ecosystem, along with data about the signals used to determine the risk probability, and the user may determine whether to ban the developer account. The risk probability may also be used with an automated system that may, for example, automatically ban the developer account if the risk probability meets or exceeds a threshold.

FIG. 1 shows an example system suitable for a developer risk classifier according to an implementation of the disclosed subject matter. A computer 100 may include a risk classifier 110 and storage 140. The computer 100 may be any suitable device, such as, for example, a computer 20 as described in FIG. 5, for implementing the risk classifier 110 and the storage 140. The computer 100 may be a single computing device, or may include multiple connected computing devices. The risk classifier 110 may use account signals 142, application signals 144, and financial signals 146, to determine risk probabilities 148. The storage 140 may store the account signals 142, the application signals 144, the financial signals 146, and the risk probabilities 148 in any suitable format.

Figure 2:
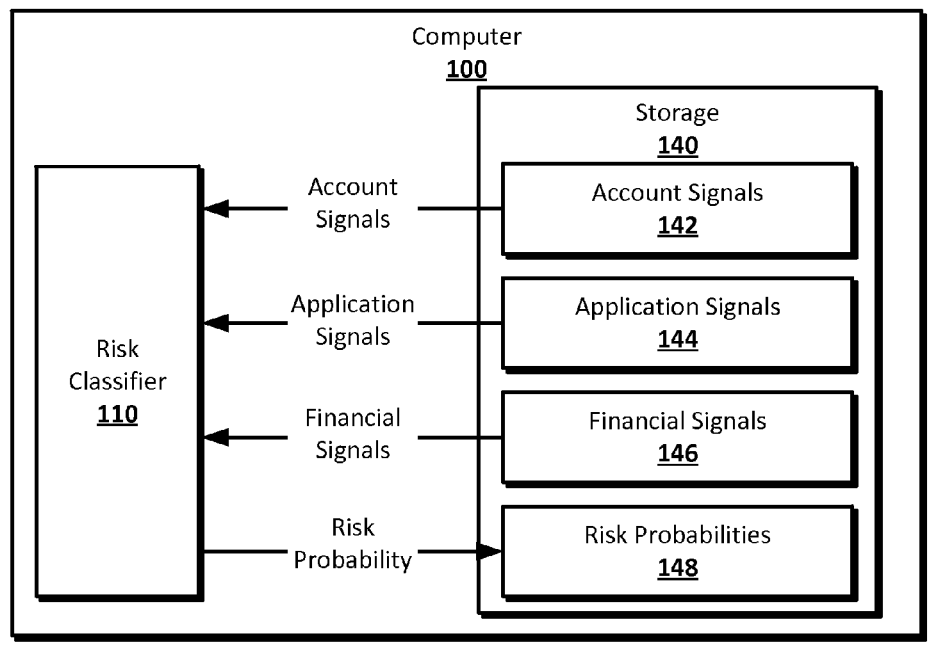
FIG. 2 shows an example arrangement for a developer risk classifier according to an implementation of the disclosed subject matter.

FIG. 2 shows an example arrangement for a developer risk classifier according to an implementation of the disclosed subject matter. Signals may be gathered for developer accounts in an application ecosystem. The developer accounts may be used by developers of applications to distribute the applications through the application ecosystem. The applications may be of any application type for any type of computing device, such as, for example, personal computers and mobile computing devices. The signals may include the account signals 142, the applications signals 144, and the financial signals 146, and may gathered in any suitable manner, including through automated systems and manual data gathering and entry. The gathered account signals 142, applications signals 144, and financial signals 146 may be stored in the storage 140.

The account signals 142, the applications signals 144, and the financial signals 146 may be used to determine the risk probabilities 148 for the developer accounts in the application ecosystem. For example, the risk classifier 110 may receive the account signals 142, the applications signals 144, and the financial signals 146 that were gathered for a specific developer account and use them to determine the risk probability 148 for that developer account. The determined risk probability 148 may then be stored in the storage 140 with any other risk probabilities 148 for other developer accounts. The account signals 142, the applications signals 144, and the financial signals 146 may have associated scores and weights. The scores may be stored with the account signals 142, the applications signals 144, and the financial signals 146, and may be assigned the by the risk classifier 110 or determined when the signals are gathered by any other suitable system.

The account signals 142 for the developer account used by the risk classifier 110 to determine the risk probability 148 may include the spam signal, the IP address signal, and the umbrella account conversion time signal. The score for the spam signal may have a weight of 1.0, and may be 1.0 when the number of accounts, including umbrella and developer accounts, opened by the user who opened the developer account reaches a certain threshold and 0 when the number of accounts does not reach the threshold. For example, if the threshold is 15, and the user has opened 18 umbrella accounts, the score for the spam signal for the user's developer account may be 1.0.

The score for the IP address signal may have a weight of 0.7, and may be scored based on a table correlating a banned prevalence percentage for the matched IP addresses to a score between 0 and 1.0. For example, a banned prevalence percentage of 0% may have a score of 0, a banned prevalence percentage greater than 0% and less than 50% may have a score of 0.5, a banned prevalence percentage greater than or equal to 50% and less than 60% may have a score of 0.8, a banned prevalence percentage greater than or equal to 60% and less than 70% may have a score of 0.9, and a banned prevalence percentage greater than or equal to 70% may have a score of 1.0. For example, if there are no matched IP addresses between the developer account and banned developer accounts, the banned prevalence percentage may be 0%, and the score for the IP address matches may be 0. If the IP addresses used to log in to the developer account match IP addresses used to log in to 10 total developer accounts, 7 of which are banned, the banned prevalence percentage may be 70%, and the score for IP address signal may be 1.0.

The score for the umbrella account conversion signal time may have a weight of 0.6, and may be scored based on the amount of time elapsed between the creation of an umbrella account and the conversion of that umbrella account into a developer account. For example, a conversion time of greater than 72 hours may have a score of 0, a conversion time within 72 hours but after 48 hours may have a score of 0.7, a conversion time within 48 hours but after 24 hours may have a score of 0.85, and a conversion time within 24 hours may have a score of 1.0. For example, if the developer account was converted from an umbrella account 35 hours after the creation of the umbrella account, the score for the umbrella account conversion time signal may be 0.85.

The application signals 144 for the developer account used by the risk classifier 110 to determine the risk probability 148 may include the application flagging signal, the advertising identification signal, the certificate signal, the asset signal, and the combination application signal. The score for the application flagging signal may have a weight of 1.0, and may be scored based on flagging done by an application scorer. The application scorer may score and flag applications based on security risks posed by the applications, or violations of policies of the application ecosystem by the applications. For example, the score for the application flagging signal for the developer account may be 1.0 if any application submitted by the developer account has been flagged by the application scorer, and 0 if no applications submitted by the developer account have been flagged.

The score for the advertising identification signal may have a weight of 0.9, and may be scored based on a table correlating a banned prevalence percentage for the matched advertising identifications to a score between 0 and 1.0. For example, a banned prevalence percentage of 0% may have a score of 0, a banned prevalence percentage greater than 0% and less than 30% may have a score of 0.5, a banned prevalence percentage greater than or equal to 30% and less than 40% may have a score of 0.6, a banned prevalence percentage greater than or equal to 40% and less than 50% may have a score of 0.7, a banned prevalence percentage greater than or equal to 50% and less than 60% may have a score of 0.8, a banned prevalence percentage greater than or equal to 60% and less than 70% may have a score of 0.9, and a banned prevalence percentage greater than or equal to 70% may have a score of 1.0. For example, if advertising identifications used by the developer account for the developer account itself or for applications submitted from the developer account match advertising identifications for 10 total developer accounts or applications, 6 of which are banned developer accounts or applications submitted from banned developer accounts, the banned prevalence percentage may be 60%, and the score for the advertising identification signal may be 0.9.

The score for the certificate signal may have a weight of 0.9, and may be scored based on a table correlating a banned prevalence percentage for the matched certificates to a score between 0 and 1.0. For example, a banned prevalence percentage of 0% may have a score of 0, a banned prevalence percentage greater than 0% and less than 30% may have a score of 0.5, a banned prevalence percentage greater than or equal to 30% and less than 40% may have a score of 0.6, a banned prevalence percentage greater than or equal to 40% and less than 50% may have a score of 0.7, a banned prevalence percentage greater than or equal to 50% and less than 60% may have a score of 0.8, a banned prevalence percentage greater than or equal to 60% and less than 70% may have a score of 0.9, and a banned prevalence percentage greater than or equal to 70% may have a score of 1.0. For example, if certificates used to sign applications submitted by the developer account match certificates used to sign applications from 10 total developer accounts, 4 of which are banned, the banned prevalence percentage may be 40%, and the score for certificate signal may be 0.7.

The score for the asset signal may have a weight of 0.9, and may be scored and may be scored based on a table correlating a banned prevalence percentage for the matched assets to a score between 0 and 1.0. For example, a banned prevalence percentage of 0% may have a score of 0, a banned prevalence percentage greater than 0% and less than 30% may have a score of 0.5, a banned prevalence percentage greater than or equal to 30% and less than 40% may have a score of 0.6, a banned prevalence percentage greater than or equal to 40% and less than 50% may have a score of 0.7, a banned prevalence percentage greater than or equal to 50% and less than 60% may have a score of 0.8, a banned prevalence percentage greater than or equal to 60% and less than 70% may have a score of 0.9, and a banned prevalence percentage greater than or equal to 70% may have a score of 1.0. For example, if assets used in applications submitted by the developer account match assets used in applications from 10 total developer accounts, 5 of which are banned, the banned prevalence percentage may be 50%, and the score for asset signal may be 0.8.

The combination application signal may have a weight of 1.0, and may be scored based on the number of matches to banned developer accounts that were found for the signals for the advertising identification matches, the certificate matches, and the asset matches. For example, 3 or more matches for the advertising identifications, certificates, or assets from applications submitted by the developer account may result in a combination application signal score of 1.0, 2 matches may result in a score of 0.9, and fewer than 2 matches may result in a score of 0. For example, if there were 2 matches to banned developer accounts for the advertising identifications used in applications submitted from the developer account, 1 match for the certificates, and 1 match for the assets, the total of 4 matches may result in the score for the combination application signal being 1.0.

The financial signals 146 for the developer account used by the risk classifier 110 to determine the risk probability 148 may include the buyer signal. The score for the buyer signal may have a weight of 1.0, and may be based on the number of data items the user who created the developer account has in common with the users who created banned developer accounts. For example, matching phone number digits may result in a score of 0.5, a matching login IP address, physical address, or email address domain may result in a score of 0.7, a matching contact name, entire phone number, email address, or company name may result in a score of 0.9, and a matching payment instrument, for example, credit card or bank account, or unique identifier for the computing device, or two matches from any of the data items that would result in lower scores on their own, may result in a score of 1.0. For example, if the user who created the developer account has the same email address and phone number as a user who created a banned developer account, the score for the buyer signal for the developer account may be 1.0.

The risk classifier 110 may determine the risk probability 148 from any available signals from the account signals 142, the application signals 144, and the financial signals 146 in any suitable manner. For example, the scores for the available signals may be combined according to:

$$RP = \frac{\sum_{i=1}^{n} w_i \cdot s_i}{n} \quad (1)$$

where RP is the risk probability for the developer account, n is the number of signals available for the developer account, for example, from the account signals 142, the application signals 144, and the financial signals 146, $w_i$ is the weight for the signal i, and $s_i$ is the score the signal i. The risk probability 148 may be the sum of each score for an available signal multiplied by the weight for the signal, and divided by the number of available signals.

For example, the developer account may have a score for a spam signal of 1.0, an IP address signal score of 0.8, an umbrella account conversion time signal score of 0.85, an application flagging signal score of 1.0, an advertising identification signal score of 0.9, a certificate signal score of 0.7, an asset signal score of 0.8, a combination application signal score of 1.0, and a score for a buyer signal of 0.9, for a total of 9 available signals. The risk probability 148 for the developer account may be determined by the risk classifier 110 as:

((1.0\*1.0)+(0.7\*0.8)+(0.6\*0.85)+(1.0\*1.0)+
(0.9\*0.9)+(0.9\*0.7)+(0.9\*0.8)+(1.0\*1.0)+
(1.0\*0.9))/9=0.79.

In some instances, signals may have super weights. When a signal has a super weight, the weight for the signal may be 1.0, and if the score for the signal is also 1.0, then the risk probability 148 for the developer account will be set 1.0, by, for example, the risk classifier 110, regardless of the weights and scores for the other available signals. For example, the spam signal, the buyer signal, the application flagging signal, and the combination application signal may have super weights. If the application flagging signal score for the developer account is 1.0 because one of the applications submitted from the developer account has been flagged, then the risk probability 148 for the developer account may be 1.0 due to the super weight on the application flagging signal score.

The risk probabilities 148 may be used determine a rank for a cluster of related developer accounts. For example, the risk classifier 110 may determine that a number of developer accounts are related using the account signals 142, the applications signals 144, and the financial signals 146 or any other suitable data on the developer accounts. The rank of the cluster of related developer accounts may determined by averaging the risk probabilities 148 for all of the developer accounts in the cluster, and multiplying the result by the number of developer accounts in the cluster. The rank may provide an indication as to the concentration developer accounts that may need to be banned within the cluster of related developer accounts, and may be used, for example, to establish priority when deciding which developer accounts to review.

Related developer accounts may be determined based on shared signals between developer accounts. For example, the sharing of advertising identifications, certificates, assets, login IP addresses, buyer data items between developer accounts, or the creation of the developer accounts by the same user, may be used to determine which developer accounts belong in a cluster, in any suitable manner.

Figures 3, 4:
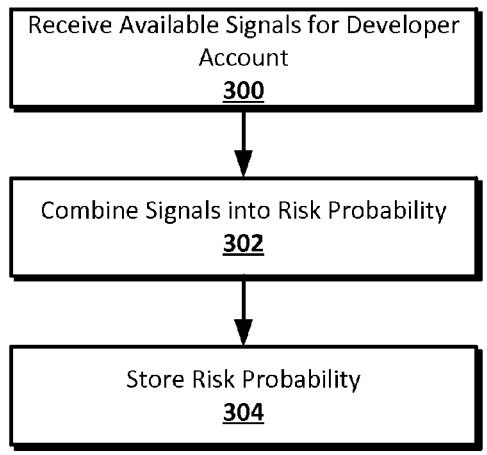
FIG. 3 shows an example process for determining a risk probability according to an implementation of the disclosed subject matter.
FIG. 4 shows an example visualization of a developer risk classifier according to an implementation of the disclosed subject matter.

FIG. 3 shows an example process for determining a risk probability according to an implementation of the disclosed subject matter. At 300, the available signals for a developer account may be received. For example, the risk classifier 110 may receive the signals that are available for the developer account being evaluated from the account signals 142, the applications signals 144, and the financial signals 146. The signals may have been gathered in any suitable manner and stored in the storage 140.

At 302, the signals may be combined to determine a risk probability. For example, the risk classifier 110 may combine the received signals from the account signals 142, the applications signals 144, and the financial signals 146 to determine the risk probability 148 for the developer account being evaluated. The risk classifier 110 may, for example, assign a score to each of the available signals using, for example, banned prevalence percentage or any other suitable scoring system, or may receive already assigned scores. Different signals may be scored with different scoring systems. The risk classifier 110 may combine the scores for the available signals with weights for the available signals to determine the risk probability 148. For example, each score for an available signal may be multiplied by the weight for the signal, with the results summed across all of the available signals. The result of the summation may then be divided by the number of available signals to produce the risk probability 148.

At 304, the risk probability may be stored. For example, the risk classifier 110 may store the risk probability 148 in the storage 140 with the risk probabilities 148. The risk probabilities 148 may be stored in any suitable format. The risk probabilities 148 may be accessed by, for example, an automated system for determining whether to ban developer accounts, or users who are, for example, administrators of the application ecosystem who need to determine whether to ban developer accounts.

FIG. 4 shows an example visualization of a developer risk classifier according to an implementation of the disclosed subject matter. The risk probabilities 148 may be displayed to a user of a tool 400 for banning developer accounts from the application ecosystem. The display of the tool 400 may include a ban check box 410, a developer name 420, a risk probability 430, a status 440, signals 450, and prevalence 460 for each of the developer accounts being viewed. The ban check box 410 may be an interactive check box the user can check to ban the developer account. For example, the user may be banning AppDev2. The developer name 420 may be the name given to the developer account by the user of the developer account. The risk probability 430 may be the risk probability 148 for the developer as determined by, for example, the risk classifier 110, and may be received by the tool 400 from the risk probabilities 148 in the storage 140. The status 440 may be the current status of the developer account, which may be, for example, banned or paid. For example, AppDev1 may be a developer account that has been banned from submitting applications to the application ecosystem. AppDev4 may be a paid developer account, which may be a developer account that is not banned and is being paid based on advertising in or sales of its applications in the application ecosystem. Signals 450 may be a listing of the available signals from the account signals 142, the applications signals 144, and the financial signals 146 that were used to determine the risk probability 148 for the developer account by, for example, the risk classifier 110. For example, AppDev1 may have a spam signal of 1.0, two advertising identifications that were matched, and unique identifier for a computing device that was matched. The prevalence 460 may be the prevalence with which the signals were found in banned developer accounts among all developer accounts, or developer accounts in a cluster with the developer account, in which the signals were found. For example, the prevalence 460 for the spam signal for AppDev1 may be ⅔, indicating that three developer accounts have spam signal scores of 1.0, and among those, 2 were banned. The prevalence 460 for signals that use banned prevalence percentage may be the banned prevalence percentage.

Figure 5:
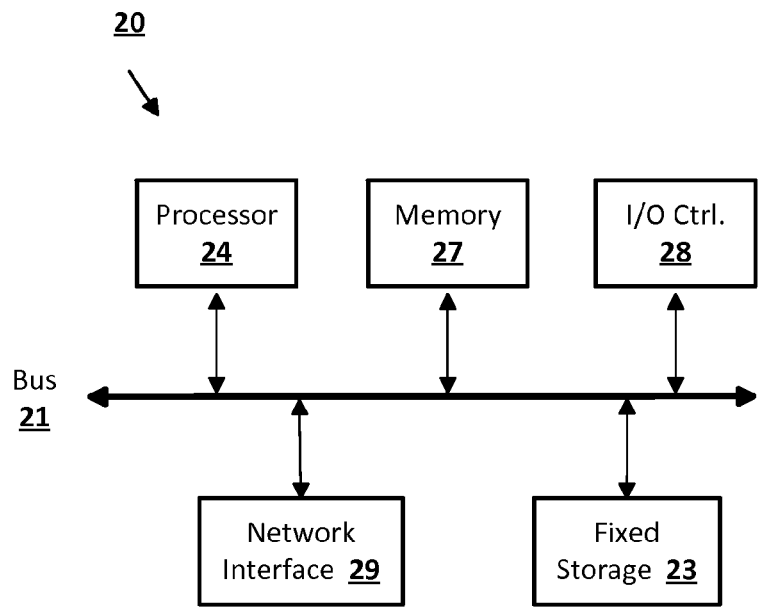
FIG. 5 shows a computer according to an embodiment of the disclosed subject matter.

Embodiments of the presently disclosed subject matter may be implemented in and used with a variety of component and network architectures. FIG. 5 is an example computer system 20 suitable for implementing embodiments of the presently disclosed subject matter. The computer 20 includes a bus 21 which interconnects major components of the computer 20, such as one or more processors 24, memory 27 such as RAM, ROM, flash RAM, or the like, an input/output controller 28, and fixed storage 23 such as a hard drive, flash storage, SAN device, or the like. It will be understood that other components may or may not be included, such as a user display such as a display screen via a display adapter, user input interfaces such as controllers and associated user input devices such as a keyboard, mouse, touchscreen, or the like, and other components known in the art to use in or in conjunction with general-purpose computing systems.

The bus 21 allows data communication between the central processor 24 and the memory 27. The RAM is generally the main memory into which the operating system and application programs are loaded. The ROM or flash memory can contain, among other code, the Basic Input-Output system (BIOS) which controls basic hardware operation such as the interaction with peripheral components. Applications resident with the computer 20 are generally stored on and accessed via a computer readable medium, such as the fixed storage 23 and/or the memory 27, an optical drive, external storage mechanism, or the like.

Each component shown may be integral with the computer 20 or may be separate and accessed through other interfaces. Other interfaces, such as a network interface 29, may provide a connection to remote systems and devices via a telephone link, wired or wireless local- or wide-area network connection, proprietary network connections, or the like. For example, the network interface 29 may allow the computer to communicate with other computers via one or more local, wide-area, or other networks, as shown in FIG. 6.

Many other devices or components (not shown) may be connected in a similar manner, such as document scanners, digital cameras, auxiliary, supplemental, or backup systems, or the like. Conversely, all of the components shown in FIG. 5 need not be present to practice the present disclosure. The components can be interconnected in different ways from that shown. The operation of a computer such as that shown in FIG. 5 is readily known in the art and is not discussed in detail in this application. Code to implement the present disclosure can be stored in computer-readable storage media such as one or more of the memory 27, fixed storage 23, remote storage locations, or any other storage mechanism known in the art.

Figure 6:
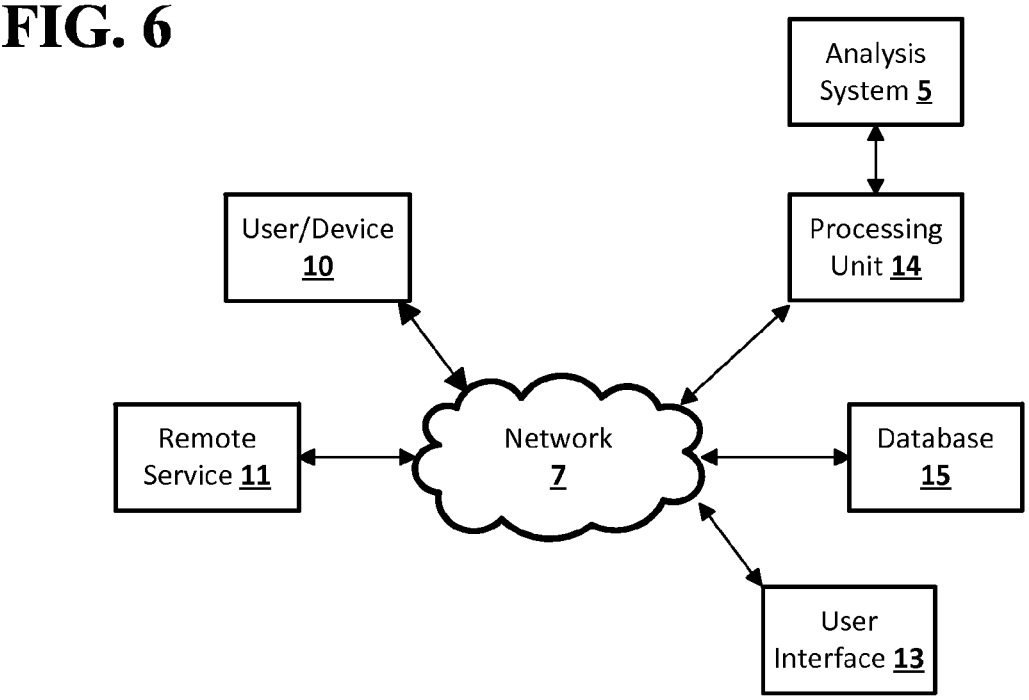
FIG. 6 shows a network configuration according to an embodiment of the disclosed subject matter.

FIG. 6 shows an example arrangement according to an embodiment of the disclosed subject matter. One or more clients 10, 11, such as local computers, smart phones, tablet computing devices, remote services, and the like may connect to other devices via one or more networks 7. The network may be a local network, wide-area network, the Internet, or any other suitable communication network or networks, and may be implemented on any suitable platform including wired and/or wireless networks. The clients 10, 11 may communicate with one or more computer systems, such as processing units 14, databases 15, and user interface systems 13. In some cases, clients 10, 11 may communicate with a user interface system 13, which may provide access to one or more other systems such as a database 15, a processing unit 14, or the like. For example, the user interface 13 may be a user-accessible web page that provides data from one or more other computer systems. The user interface 13 may provide different interfaces to different clients, such as where a human-readable web page is provided to web browser clients 10, and a computer-readable API or other interface is provided to remote service clients 11. The user interface 13, database 15, and processing units 14 may be part of an integral system, or may include multiple computer systems communicating via a private network, the Internet, or any other suitable network. Processing units 14 may be, for example, part of a distributed system such as a cloud-based computing system, search engine, content delivery system, or the like, which may also include or communicate with a database 15 and/or user interface 13. In some arrangements, an analysis system 5 may provide back-end processing, such as where stored or acquired data is pre-processed by the analysis system 5 before delivery to the processing unit 14, database 15, and/or user interface 13. For example, a machine learning system 5 may provide various prediction models, data analysis, or the like to one or more other systems 13, 14, 15.

The foregoing description, for purpose of explanation, has been described with reference to specific embodiments. However, the illustrative discussions above are not intended to be exhaustive or to limit embodiments of the disclosed subject matter to the precise forms disclosed. Many modifications and variations are possible in view of the above teachings. The embodiments were chosen and described in order to explain the principles of embodiments of the disclosed subject matter and their practical applications, to thereby enable others skilled in the art to utilize those embodiments as well as various embodiments with various modifications as may be suited to the particular use contemplated.

The invention claimed is:

1. A computer-implemented method performed by a data processing apparatus, the method comprising:
Receiving, by a hardware processor, at least two signals associated with a developer account for an application ecosystem, wherein each of the signals comprises one of an account signal, an application signal, and a financial signal, and each of the signals is associated with a weight and a score;
combining the at least two signals using the weights and the scores associated with the signals to obtain a risk probability for the developer account; and
storing the risk probability,
wherein at least one of the scores associated with one of the signals is based on a banned prevalence percentage, and wherein
an account signal comprises one of a spam signal, an Internet Protocol address signal, and an umbrella account conversion time signal,
an application signal comprises one of an application flagging signal, an advertising identification signal, a certificate signal, an asset signal, and a combination application signal, and
a financial signal comprises a buyer signal.

2. The computer-implemented method of claim 1, wherein combining the at least two signals comprises:
summing the result of multiplying the score for each of the at least two signals by the weight for the signal to obtain a sum; and
dividing the sum by the number of signals used to obtain the sum.

3. The computer-implemented method of claim 1, further comprising banning the developer account from the application ecosystem based on the risk probability.

4. The computer-implemented method of claim 1, wherein the spam signal comprises a score based on a quantity of umbrella accounts and developer accounts associated with a user of the developer account.

5. The computer-implemented method of claim 1, wherein the score for the Internet Protocol address signal is based on matching an Internet Protocol address associated with the developer account to Internet Protocol addresses associated with banned developer accounts in the application ecosystem.

6. The computer-implemented method of claim 1, wherein the score for the umbrella account conversion time signal is based on the amount of elapsed time between the creation of an umbrella account and a conversion of the umbrella account into the developer account.

7. The computer-implemented method of claim 1, wherein the score for the application flagging signal is based on a flag set for an application submitted from the developer account to the application ecosystem, wherein the flag indicates one of a security risk or policy violation in the application.

8. The computer-implemented method of claim 1, wherein the score for the advertising identification signal is based on matching advertising identifications used by applications submitted from the developer account to advertising identifications used by applications submitted from banned developer accounts in the application ecosystem.

9. The computer-implemented method of claim 1, wherein the score for the asset signal is based on matching assets used to build applications submitted from the developer account to assets used to build applications submitted from banned developer accounts in the application ecosystem.

10. The computer-implemented method of claim 1, wherein the score for the buyer signal is based on matching at least one data item for a user associated with the developer account to at least one data item for users of banned developer accounts in the application ecosystem.

11. The computer-implemented method of claim 1, wherein the score for the combination application signal is based on the advertising identification signals, the certificate signal, and the asset signal.

12. The computer-implemented method of claim 10, wherein the at least one data item comprises one of a contact name, a company name, a phone number, a physical address, an email address domain, an email address, a payment instrument, an Internet Protocol address, and a unique identifier for a computing device.

13. The computer-implemented method of claim 1, wherein the banned prevalence percentage is based on the number of banned developer accounts comprising a characteristic of a signal matching a characteristic of the signal in the developer account, and the total number of developer accounts in the application ecosystem comprising the characteristic of the signal.

14. The computer-implemented method of claim 13, wherein the characteristic of the signal is one item selected from the group of: an advertising identification for an application, a certificate used to sign the application, an asset used to build the application, and an Internet Protocol address used to access the developer account.

15. The computer-implemented method of claim 1, wherein one of the weights for one of the at least two signals is a super-weight.

16. The computer-implemented of claim 10, wherein the risk classifier is further adapted to match a data item associated with a user for one of the developer accounts with a data item for another user for another developer account in the application ecosystem, wherein the data item comprises one of a contact name, a company name, a phone number, a physical address, an email address domain, an email address, a payment instrument, an Internet Protocol address, and a unique identifier for a computing device.

17. A system comprising: one or more computers and one or more storage devices storing instructions which are operable, when executed by the one or more computers, to cause the one or more computers to perform operations comprising:
receiving at least two signals associated with a developer account for an application ecosystem, wherein each of the signals comprises one of an account signal, an application signal, and a financial signal, and each of the signals is associated with a weight and a score;
combining the at least two signals using the weights and the scores associated with the signals to obtain a risk probability for the developer account; and
storing the risk probability,
wherein at least one of the scores associated with one of the signals is based on a banned prevalence percentage, and
wherein an account signal comprises one of a spam signal, an Internet Protocol address signal, and an umbrella account conversion time signal, an application signal comprises one of an application flagging signal, an advertising identification signal, a certificate signal, an asset signal, and a combination application signal, and a financial signal comprises a buyer signal.

* * * * *